(12) United States Patent
Hernandez (10) Patent No.: US 7,316,834 B2
(45) Date of Patent: Jan. 8, 2008

(54) DRIP MAT

(76) Inventor: Roberto Hernandez, 131 Lagos Ave., Laredo, TX (US) 78045

( * ) Notice: Subject to any disclaimer, the term of this patent is extended or adjusted under 35 U.S.C. 154(b) by 222 days.

(21) Appl. No.: 11/159,221

(22) Filed: Jun. 23, 2005

(65) Prior Publication Data

US 2005/0284704 A1    Dec. 29, 2005

Related U.S. Application Data

(60) Provisional application No. 60/582,072, filed on Jun. 24, 2004.

(51) Int. Cl.
*B32B 3/10*    (2006.01)

(52) U.S. Cl. .............................. 428/60; 428/44; 296/38; 184/106; 180/69.1; 220/573

(58) Field of Classification Search ................ 428/44, 428/60; 296/38; 184/106; 180/69.1; 220/573; 137/565.01, 312; 141/86, 93
See application file for complete search history.

(56) References Cited

U.S. PATENT DOCUMENTS

| | | |
|---|---|---|
| 2,986,235 A | 5/1961 | Weibert, Jr. |
| 2,990,033 A | 6/1961 | Arnold |
| 3,141,522 A | 7/1964 | Fitzpatrick |
| 3,722,626 A | 3/1973 | Stack |
| 3,904,528 A | 9/1975 | Yocum |
| 4,246,982 A | 1/1981 | Pretnick |
| 4,484,661 A | 11/1984 | Evenson |
| 4,497,147 A | 2/1985 | Clapper et al. |
| 4,684,562 A | 8/1987 | Hartkemeyer |
| 4,798,754 A | 1/1989 | Tomek |
| 5,020,638 A | 6/1991 | Smith |
| 5,350,619 A | 9/1994 | Rasmussen |
| 5,478,625 A | 12/1995 | Wright |
| 5,482,093 A | 1/1996 | Tremonti et al. |
| 5,957,241 A | 9/1999 | Anderson |
| 5,972,470 A | 10/1999 | Engst |
| 6,054,194 A * | 4/2000 | Kane ........................... 428/12 |
| 6,120,876 A | 9/2000 | Walton |
| 6,258,430 B1 | 7/2001 | Perlman |
| 6,446,275 B1 | 9/2002 | Wright et al. |
| 6,475,594 B2 | 11/2002 | Johnston et al. |
| 6,558,769 B1 | 5/2003 | Chwala |
| 6,568,419 B1 | 5/2003 | Robinson et al. |
| 2002/0092110 A1* | 7/2002 | Blum et al. ................... 15/215 |
| 2002/0108956 A1 | 8/2002 | Doh |

FOREIGN PATENT DOCUMENTS

DE    31 22 219 A1    3/1982

(Continued)

*Primary Examiner*—Alexander S. Thomas
(74) *Attorney, Agent, or Firm*—Richard C. Litman (57) ABSTRACT

The drip mat is a durable, modular fluid collection mat that rests on the ground in high-traffic areas where vehicles move slowly or stop for extended periods of time. The mat has at least one collection block that has a floor and at least one sidewall extending around the periphery of the floor to define a well for collecting fluids that drip from the vehicle. A grill is disposed over the well. The floor has sloping panels that direct the fluids to drain holes, where the fluids can be drawn out of the mat by an expandable container that is connected to the drain holes by a flexible hose. By connecting multiple straight and curved collection blocks together, the mat can cover different size areas. The mat has ramps on either end of the collection block(s) to allow vehicles to ride upon it, and has areas for logos and advertising.

6 Claims, 10 Drawing Sheets

FOREIGN PATENT DOCUMENTS

| | | |
|---|---|---|
| DE | 36 08 952 C1 | 4/1987 |
| DE | 38 18 036 A1 | 12/1989 |
| EP | 0 363 751 A2 | 4/1990 |
| GB | 2 279 414 A | 1/1995 |

* cited by examiner

DRIP MAT

CROSS-REFERENCE TO RELATED APPLICATION

This application claims the benefit of U.S. Provisional Patent Application Ser. No. 60/582,072, filed Jun. 24, 2004.

BACKGROUND OF THE INVENTION

1. Field of the Invention

The present invention relates to a receptacle that collects fluids, such as oil, antifreeze, etc., that drip from vehicles, and more particularly to a modular drip mat that is aesthetically pleasing and collects fluids that drip from standing vehicles, such as vehicles lined up in queues in drive-through lanes and the like.

2. Description of the Related Art

Motor vehicles require a number of fluids for lubrication and cooling, such as engine oil, antifreeze, transmission fluid, etc. As vehicles age, gaskets, hoses, oil seals, and other components lose their integrity. Consequently, when these vehicles are standing, fluids leak or drip onto the roadway or parking lot under the vehicle. Such fluid leaks are aesthetically unsightly. The fluids may also collect in pools which are environmentally harmful, potentially running off with surface water to contaminate sewage and waste water treatment systems, as well as forming an attractive nuisance for pets and small animals who may drink the fluids, with resulting health problems.

Leakage of such vehicle fluids may occur when the engine is running and the vehicle is stationary, e.g., in drive through lanes at fast food restaurants, banks, service stations, and the like, or when the vehicle is parked. Vehicle fluids may also be spilled when the vehicle is being serviced for oil changes, coolant replacement, and the like, either at automotive service facilities, race tracks, or by the do-it-yourself mechanic in his driveway. In order to prevent such fluid leakage from spoiling the aesthetics of the road surfaces and parking areas and to prevent environmental damage, various mats and fluid collection devices have been devised.

U.S. Pat. No. 6,120,876, issued Sep. 19, 2000 to W. J. Walton, discloses a floor protector designed for garages or other vehicle parking areas. The floor protector lies on the ground and has ramps on one end that allow a vehicle to be driven onto the protector. The top surface of the protector includes inwardly sloping lateral surfaces, with a longitudinal channel or trough extending down the center of the top surface of the protector. The trough slopes to one end, where a removable tray is connected to the end of the trough so that any collected runoff liquid can be disposed. The device is only designed to be located in vehicle parking areas, and does not include a closed container for removing the runoff liquid nor does it include more than one entrance or exit for the vehicle.

U.S. Pat. No. 6,558,769, issued May 6, 2003 to K. Chwala, teaches a receptacle for collecting fluids dropped mainly from a vehicle. The receptacle includes a frame with sidewalls and ramped end walls. A metal grate covers the opening contained within the sidewalls and end walls. The grate is connected to the frame with a hinge. The collector may be secured to the ground in areas of heavy, slow-moving traffic, such as drive-through lanes, tollbooths, ticket booths, and driveways. The collector also includes an absorbent pad under the grate and within the frame. The absorbent pad collects any petroleum-based fluids and debris, and allows water to pass through to drain holes at the bottom sides of the frame. The collector is not designed to be connected to other collectors of the same type, nor is it designed to cover any area other than a single rectangular area.

U.S. Pat. No. 4,484,661, issued Nov. 27, 1984 to J. L. Evenson, shows a drip pan for vehicles that may be used individually or assembled with other identical pans in an array to catch liquid that drips off of parked vehicles. The drip pans have slightly raised sidewalls so that the dripping liquid is contained within those walls but vehicles can pass over the drip pans. The drip pans are not designed to have the vehicles ride on top of the pans, nor do the pans have drain holes for removing the liquid. The drip pans are connected by hooking one of the two overhanging edges of one pan over one of the two mating straight edges of another pan.

U.S. Pat. No. 6,568,419, issued May 27, 2003 to A. Robinson et al., discloses a liquid collecting mat that lies on the ground underneath industrial workers, in hospital rooms or around heavy machinery. The mat collects the liquids within a walled frame that may include sloped edges. The top surface of the mat is covered with a stiff mesh or grill. The mat may also be connected with other mats modularly to fit any space desired. The liquid collected inside the mat can be removed by vacuum pumping the liquid through a drain hole in the side of the frame and into an enclosed container. European Patent No. 363,751, published Apr. 18, 1990, also shows a fluid-collecting mat upon which a parked vehicle may sit, and which includes a opening for pumping the waste fluid out of the bottom of the tray and into a separate container.

U.S. Pat. No. 4,246,982, issued Jan. 27, 1981 to G. Pretnick, teaches a separate ramp that can be attached to a mat that lies on the ground and is used for collecting fluids that drip off of a vehicle parked on top of the mat. The mat includes a drain hole in the sidewall of the mat to which a hose can be attached to transport the collected fluid from the mat. The mat also includes a pair of elongated racks upon which the vehicle is driven that act to space the vehicle from the liquid that is being collected at the bottom of the tray. The mat also has tire stops at one end that prevent the vehicle from running off of that end of the mat.

Other patents showing liquid collecting mats that have ramps on at least one end to facilitate vehicles driving onto the mats include U.S. Pat. No. 5,478,625, issued Dec. 26, 1995 to D. M. Wright (vehicle drip mat including bottom that has peaks and valleys to corral the liquids and direct those liquids away from the vehicles' tires); U.S. Pat. No. 5,957,241, issued Sep. 28, 1999 to C. R. Anderson (oil drip mat with several absorptive layers contained within a walled frame); and U.S. Pat. No. 6,258,430, issued Jul. 10, 2001 to R. I. Perlman (portable parking mat with side walls that includes attachable ramps for the ends).

Other patents that show fluid collecting mats with sloping bottoms and drain holes include U.S. Pat. No. 5,350,619, issued Sep. 27, 1994 to L. B. Rasmussen (mat for collecting deicing fluid that drips from an aircraft and includes grooves that direct the liquid to at least one discharge opening); and U.S. Pat. No. 5,482,093, issued Jan. 9, 1996 to B. M. Tremonti et al. (automotive fluid catch basin that attaches to underside of vehicle and slopes down to a drain hole at one end). U.S. Pat. No. 6,446,275, issued Sep. 10, 2002 to R. J. Wright et al., shows a fluid collection mat with a removable grid-like top covering that collects the liquids into specific contained cells.

None of the above inventions and patents, taken either singly or in combination, is seen to describe the instant invention as claimed. Thus a drip mat solving the aforementioned problems is desired.

SUMMARY OF THE INVENTION

The drip mat is a durable, modular fluid collection mat that rests on the ground anywhere that it is desired to collect fluids that may leak from a vehicle, e.g., in high-traffic areas where vehicles move slowly or stop for extended periods of time. The mat has one or more collection blocks having a floor and at least one sidewall extending around the periphery of the floor that defines a well for containing fluids that drip from the vehicle. A grill is disposed over the well. The collection block(s) has sloping panels that direct the fluids to drain holes, where the fluids can be drawn out of the mat by an expandable container that is connected to the drain holes by a flexible hose. By connecting multiple straight and curved collection blocks together, the mat can cover different size areas. The mat has ramps on either end to allow vehicles to ride upon it, and has areas for displaying logos and advertising.

The frame, ramps and grill can be made of durable materials so that they may support the weight of vehicles riding over them, withstand chemicals dripping on them and weather intense sun, ice or rain. Because the fluids are collected and removed without need for electricity or fossil fuels, the mats help maintain a healthy environment.

Accordingly, it is a principal object of the invention to provide a drip mat to collect and contain fluids that drip from vehicles on commercial and residential premises, and do so in an aesthetically pleasing, unobtrusive, and economically functional manner.

It is another object of the invention to provide a drip mat to collect and contain fluids that drip from vehicles on commercial and residential premises, and do so across areas that vary in size and shape by using a simple, easy to install modular fluid collection mat that does not restrict the normal function of the vehicles on the premises.

It is a further object of the invention to provide a drip mat to collect and contain fluids that drip from vehicles in heavy traffic areas where the most fluids could collect, and do so in an environmentally friendly manner.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
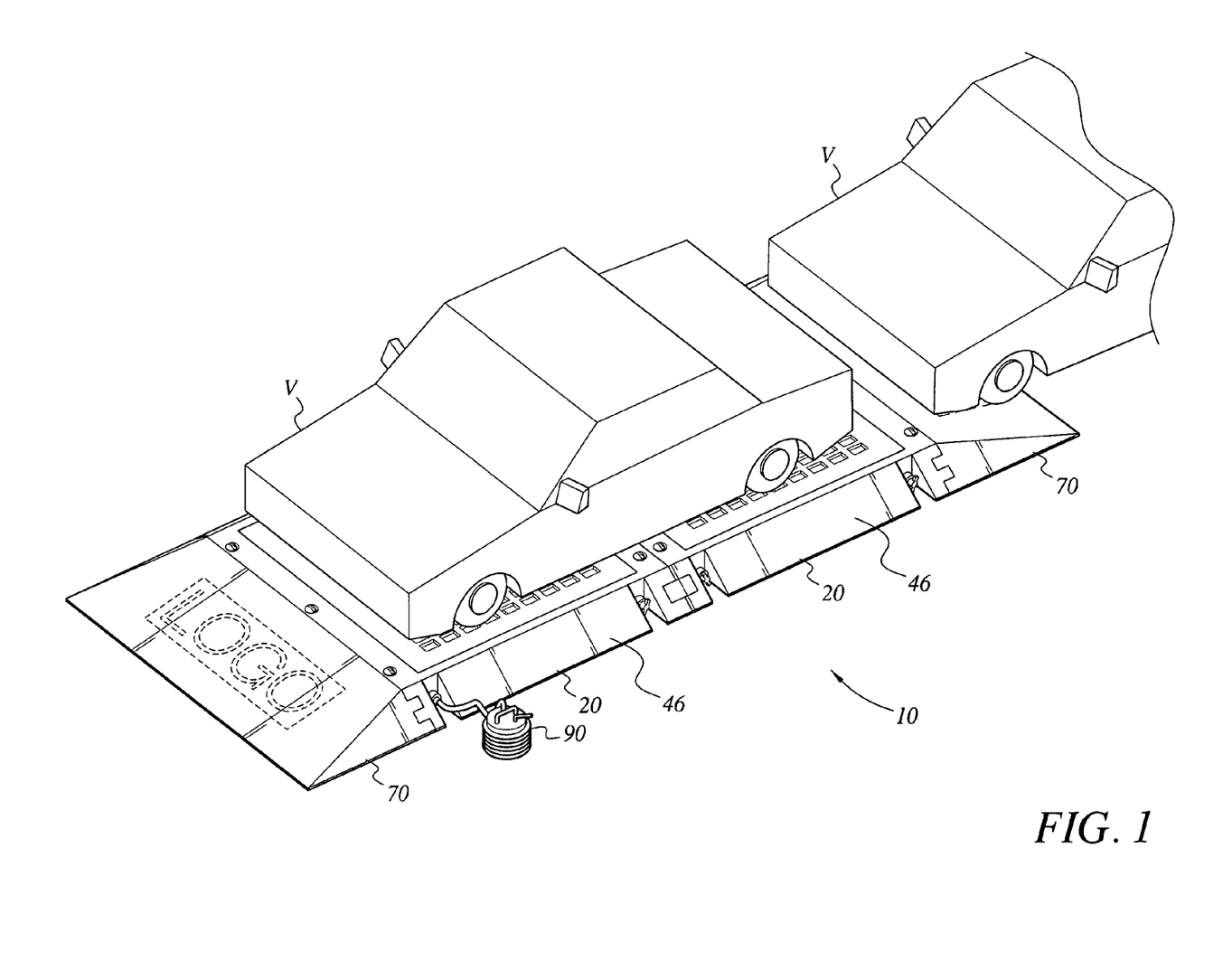
FIG. 1 is an environmental, perspective view of a drip mat according to the present invention.
Figure 2:
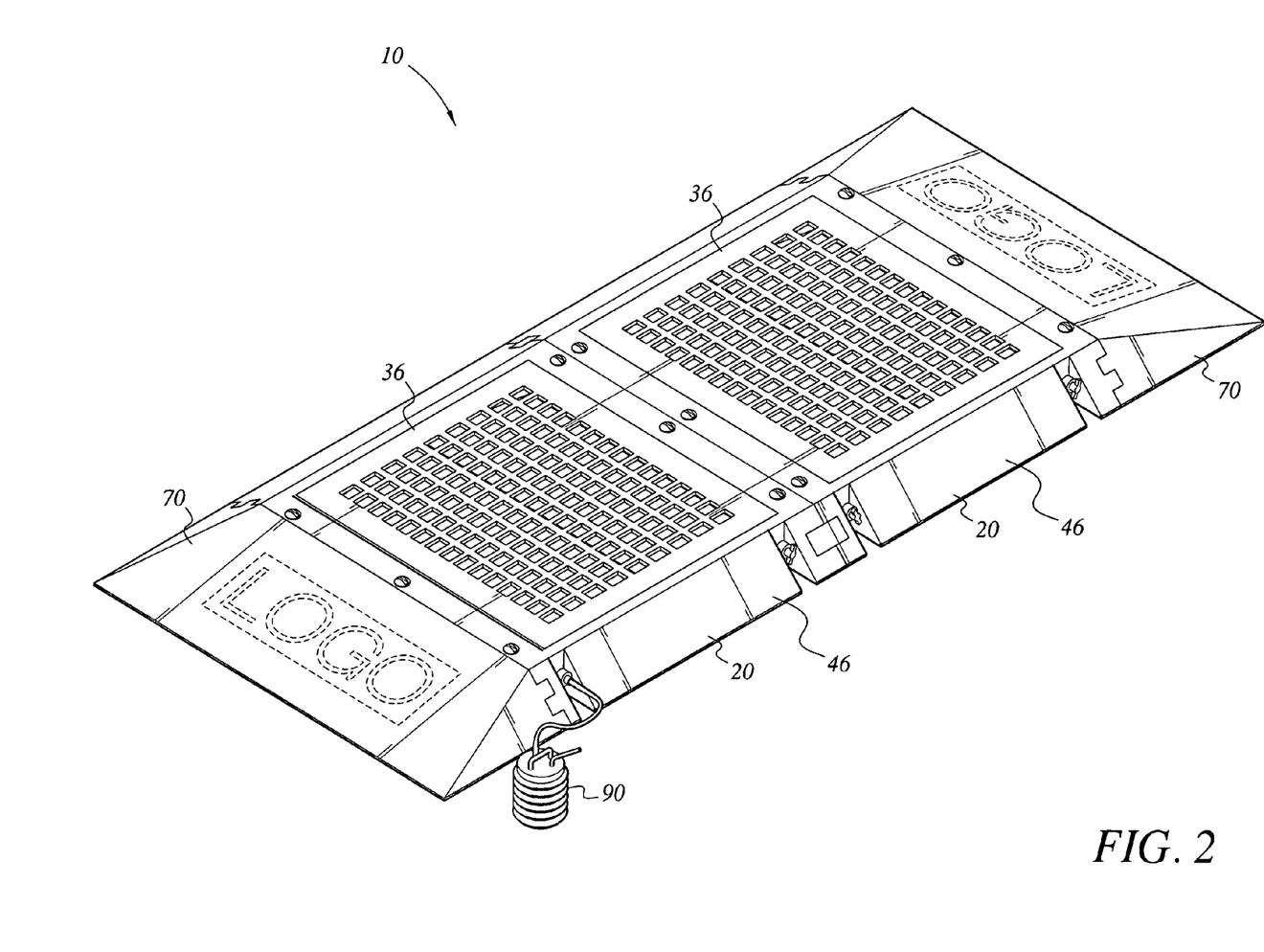
FIG. 2 is a top perspective view of a drip mat showing two straight center sections, ramps, grills and a vacuum container attached to a drain hole via a hose.

The present invention is a drip mat, designated generally as 10 in the drawings. As shown in FIG. 1, the drip mat 10 is designed to collect fluid that drips from vehicles V as the vehicles V slowly drive through areas, or park in areas, on commercial or residential properties. Referring first to FIG. 2, the drip mat 10 includes at least one modular fluid collection block 20 (two blocks 20 placed end-to-end being shown in FIG. 2), a grill 36 disposed over each collection block 20, and entrance and exit ramps 70. A vehicle V drives up one ramp 70, remains stationary or moves slowly over collection block(s) 20, and exits down the opposing ramp 70 of the drip mat 10. This is in no way intended to limit the size of the drip mat 10, as the drip mat 10 may be smaller in width than the wheel base of vehicle V, or wide enough that multiple vehicles V can pass over the drip mat 10 side by side. Vehicles V may also pass over drip mat 10 in any direction.

Figure 3A:
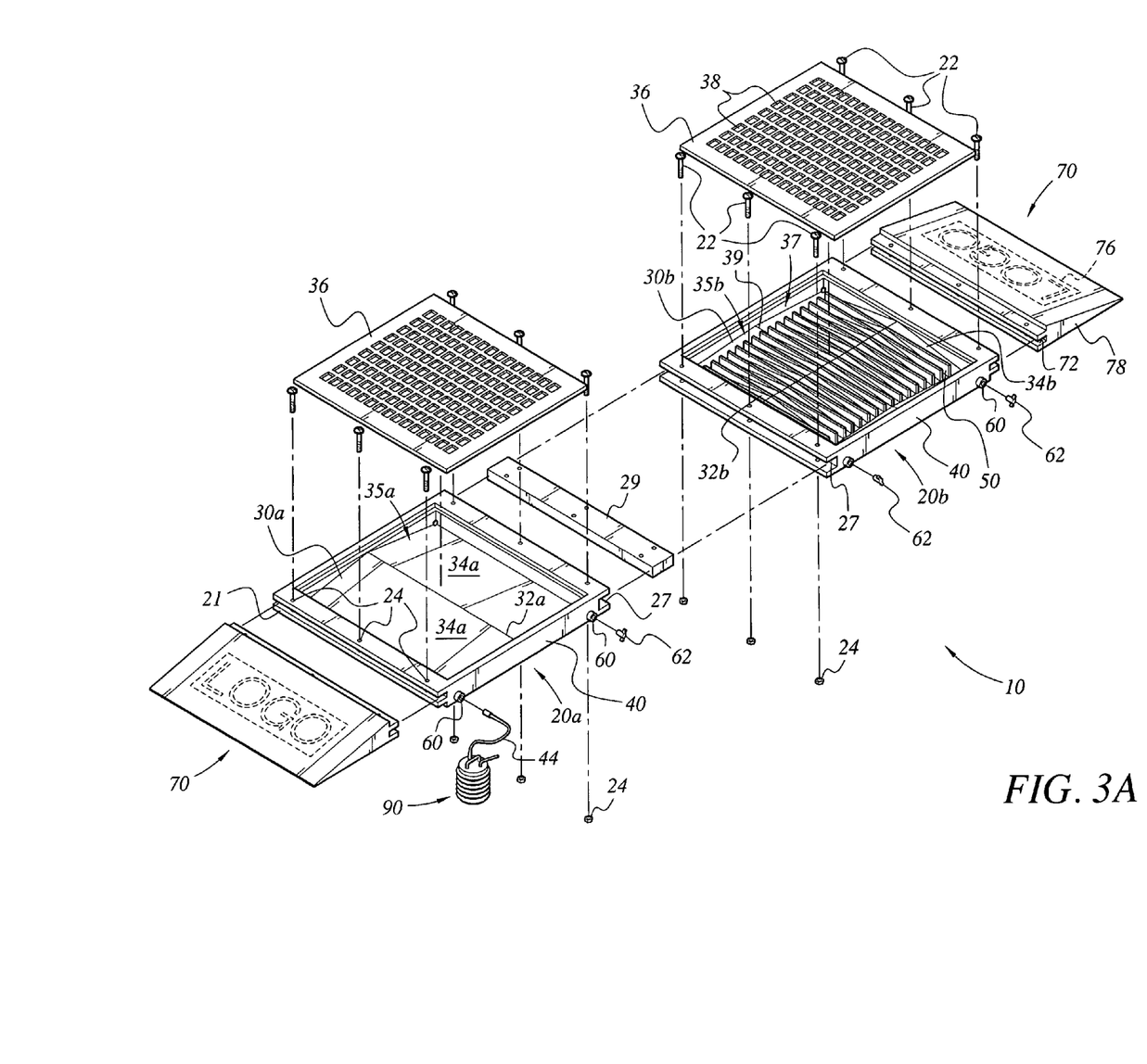
FIG. 3A is an exploded, perspective view of a drip mat with two straight center sections.

Referring to FIG. 3A, each collection block 20 has at least one sidewall 40 and a floor 30a or 30b that defines a well 35a or 35b for the collection of fluids. As shown in the left side of FIG. 3A, the floor 30a has a ridge 32a extending transversely across the well 35a between the sidewalls 40, with panels 34a sloping downward to opposite ends of the well 35a. Sloping panels 34a cause fluids which drip into the well 35a to collect at opposite ends of the well 35a. Alternatively, as shown in the right side of FIG. 3A, the floor 30b may have a ridge 32b that extends longitudinally across the well 35b between the end walls, with panels 34b sloping downward toward channels 37 on opposite sides of the well 35b. The sloping panels 34b may have regularly spaced raised ribs 50 running transversely across the well 35b for supporting the grill 36, instead of a ledge extending about the perimeter of the sidewall 40, as with the well 35a. Each channel 37 extends between the ends of the well 35b, and has a peak 39 extending across the center of the channel 37 so that opposing ends of the channel 37 slope downward toward the end walls of the well 35b. It will be appreciated that although the well 35a or 35b is shown having a square or rectangular shape in the drawings, well 35a or 35b may be circular, arcuate, polygonal, or any other desired shape, provided that the well 35a or 35b extends over the majority of the top surface area of the collection block 20.

Referring back to FIG. 2, the sidewalls 40 of the well 35a or 35b may be sloped in order to form side ramps 46. The side ramps 46 may extend from one end wall of the drip mat 10 to the opposing end wall of the drip mat 10. Side ramps 46 allow vehicles V to ride smoothly over the mat 10 and prevent the vehicles V from abruptly dropping off the side of the mat 10.

Figure 4:
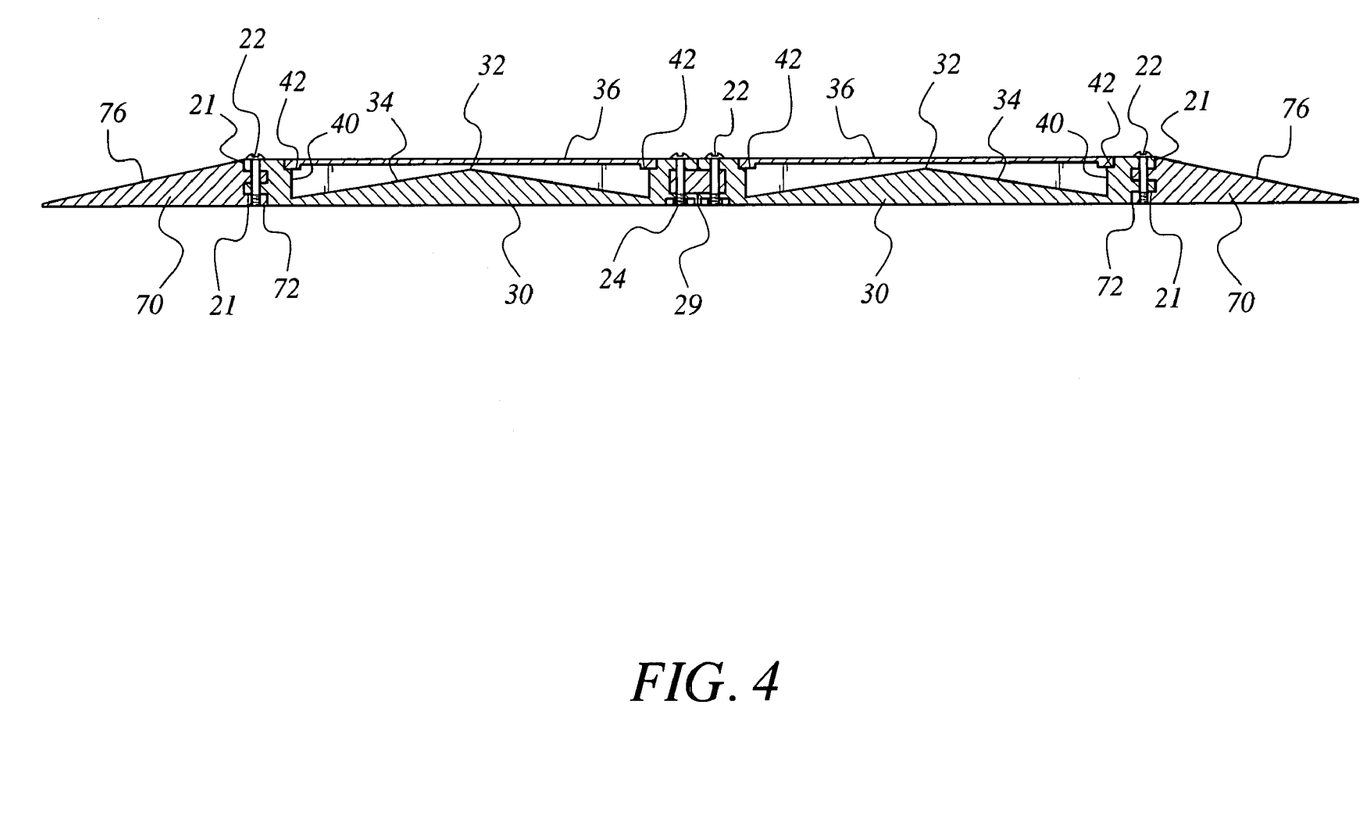
FIG. 4 is a vertical cross section view of the drip mat according to the present invention.

A grill 36 is disposed over the well 35a or 35b. The grill 36 has a plurality of apertures or slots 38 defined therein which permit fluids that drip from vehicles V to drain into the well 35a or 35b, but prevent solid matter from falling into the well 35a or 35b. FIG. 4 shows a pair of collection blocks in series in which the floor has a transverse peak 32 defining panels 34. As shown in FIG. 4, grill 36 may rest on a ledge 42 defined about the periphery of sidewall 40 above the panels 34 forming floor 30, or alternatively, as shown in the right side of FIG. 3A, grill 36 may rest on the raised ribs 50 extending above the floor 30b of the well 35b, and may optionally be secured by fasteners, such as bolts, hinges, magnets, adhesive, etc. The collection block 20 may optionally contain any number of filtering layers under the grill 36 within the well 35. The filtering layers may be made from sand, cloth, gravel, or any other material commonly used for filtering oil and other vehicular fluids from water. The filter layers may be colored or printed on to provide additional placements for advertising.

Figure 3B:
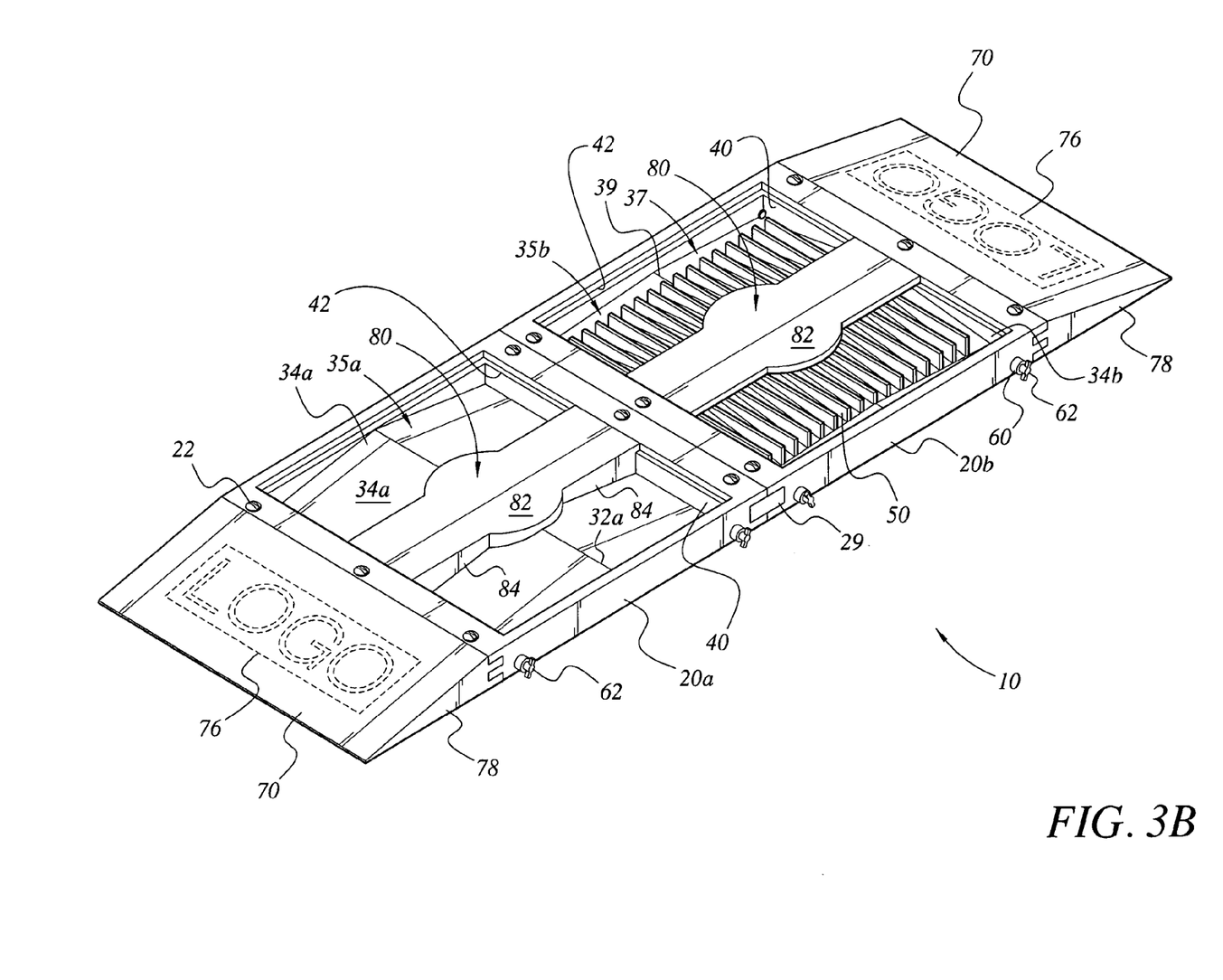
FIG. 3B is a perspective view of a drip mat in which the straight center sections of the drip mat include motorcycle inserts.

In lieu of grill 36, a motorcycle insert 80 may be placed across the well 35a or 35b, as shown in FIG. 3B. As shown in the left side of FIG. 3B, motorcycle insert 80 has a cylindrical center body 82 and elongated, rectangular legs 84 extending from diametrically opposite sides of cylindrical body 82 to opposing ends of the well 35a. The motorcycle insert 80 has a bottom surface that extends downward to meet or join the panels 34a of the floor, so that well 35a may be viewed as having four quadrants, the well 35a being divided longitudinally by motorcycle insert 80 and laterally by ridge 32a. Motorcycle insert 80 may rest on ledge 42 and be retained in well 35a by pressure fit, or optionally by fasteners, such as bolts, screws, magnets, hinges, etc. As shown in the right side of FIG. 3B, motorcycle insert 80 may alternatively have slots on its bottom surface to fit over the raised ribs 50 on the floor 30b.

A drain port 60 is disposed on the side of the collection block 60 at each end of the well 35a or 35b, and preferably on both sides of the drip mat 10, particularly when the drip mat is intended for use with motorcycle insert 80. Drain port 60 is normally fitted with a drain plug 62 to prevent fluids collected in the well 35 from spilling out the drain port 60. Drain port 60 may be internally threaded, either by having threads machined or tapped into the wall of the port 60, or by a threaded insert pressure fit into the port 60. Optionally, drain port 60 may be fitted with a valve, which may be externally threaded, in order to prevent fluids from exiting drain port 60 when connecting a collection container to the drain port 60. Where the drip mat includes side ramps 46 on the sidewalls of the well 35, the drain port 60 extends through notches in the side ramps 46, so that the drain port 60 exits through a vertical surface.

Figure 5A:
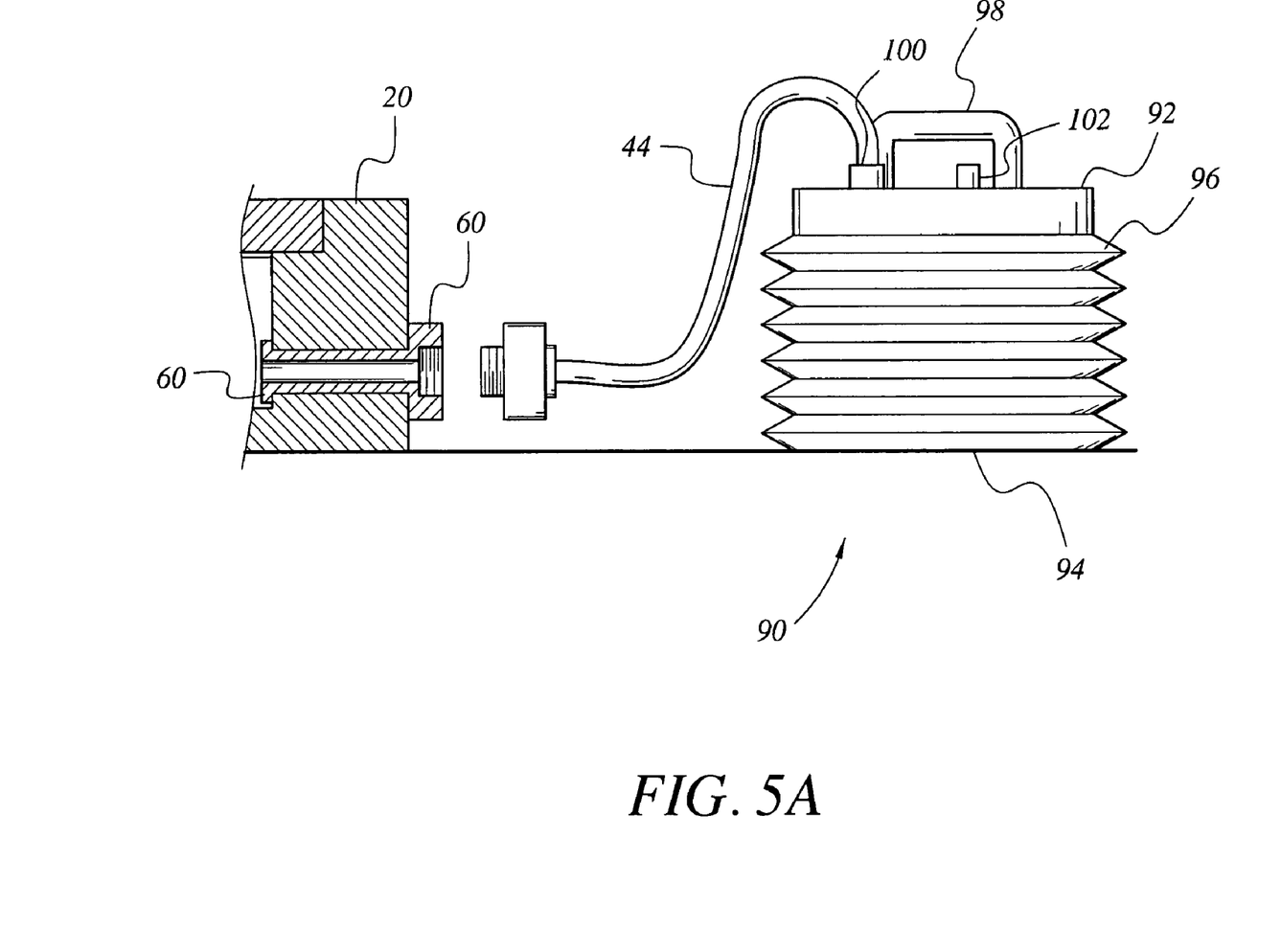
FIG. 5A is an exploded elevation view of an expandable container attachable to the drain holes and drain inserts in the sides of the drip mat, shown fragmented and in section.
Figure 5B:
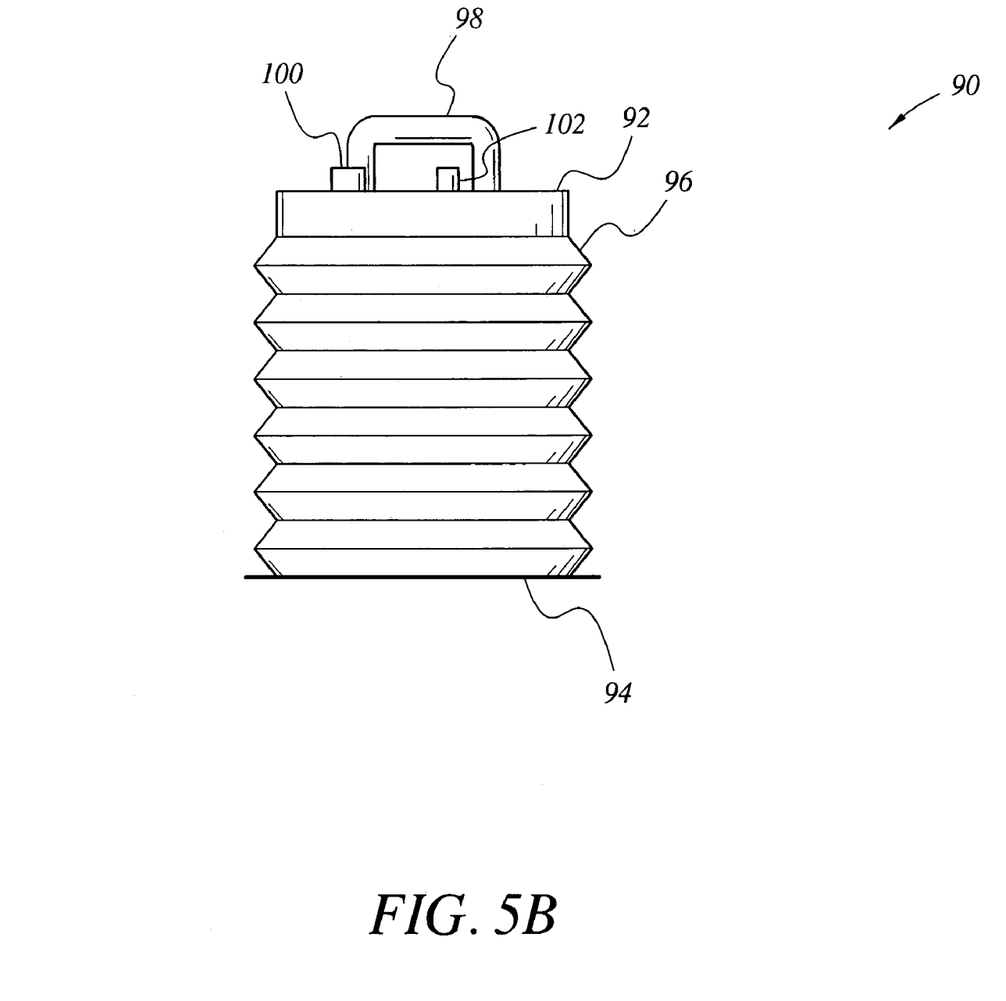
FIG. 5B is an elevation view of the expandable container for the drip mat of the present invention, shown in an expanded state.

Referring particularly to FIGS. 5A and 5B, a container 90 is provided for draining fluids from the collection block 20 as needed. Container 90 has a top plate 92, a bottom plate 94, and at least one sidewall 96. A handle 98 is disposed on the top plate 92 for carrying the container. The container 90 has an inlet port 100 and a pressure relief valve 102. The container 90 may optionally have an additional outlet opening and a spout for draining the collected fluids from the container 90. A flexible hose 44 is used to connect the drain port 60 of the drip mat 10 to the inlet port 100 of the container 90 by a threaded fitting. The sidewall 96 of the container 90 is preferably a bellows-type expandable wall so that a vacuum can be created to help draw fluid from the well 35a or 35b through the drain port 60 and flexible hose 44 to supplement the gravity feed.

Referring back to FIGS. 3A and 4, drip mat 10 includes entrance and exit ramps 70 connected to opposite ends of collection block(s) 20. Ramps 70 may be connected to collection block(s) 20 in any desired manner. In a preferred embodiment, opposite ends of collection block 20 have elongate fingers 21 formed therein which mate and overlap with elongate fingers 72 formed in one end of ramp 70. The finger joint formed by overlapping fingers 21 and 72 may be secured by fasteners, such as bolts 22 through threaded bores defined in the bottom fingers 72 of ramp 70. The bolts 22 may optionally extend into threaded bores located in the ground underneath the drip mat 10, so that the drip mat 10 may be secured to the ground. Ramps 70 slope downward gradually from the finger joint to the ground so that vehicle V can make smooth transition onto grill 36 and then off the mat 10. The top surface 76 and side surfaces 78 of ramps 70 provide a convenient display area for advertisements and/or a logo.

A shown in FIGS. 2 and 3A, the length of the drip mat 10 may be extended by connecting multiple collection blocks 20 together between ramps 70. This may be accomplished by providing at least one end of collection block 20 with a spline joint instead of a finger joint. The spline joint comprises a slot 27 defined in adjacent ends of the collection blocks and a spline 29 that is slidably received in the slots 27. The spline joint is secured by fasteners, such as bolts 22 and nuts 24 which extend through the ends of collection block 20 and spine 29. Collection block 20 may have countersunk apertures defined therein for receiving the heads of bolts 22 and nuts 24 used to attach adjacent collection blocks and used to attach ramps 70 to collection blocks 20. Although the drawings only show two collection blocks 20 attached to each other, it will be obvious to those skilled in the art that the length of drip mat 10 may be further extended to any desired length by providing additional intermediate collection blocks furnished with slots 27 defined in both ends for forming spline joints at both ends of the intermediate collection blocks. Further, the width of drip mat 10 may be extended laterally by forming similar spline joints on the sides of collection blocks 20.

Figure 6:
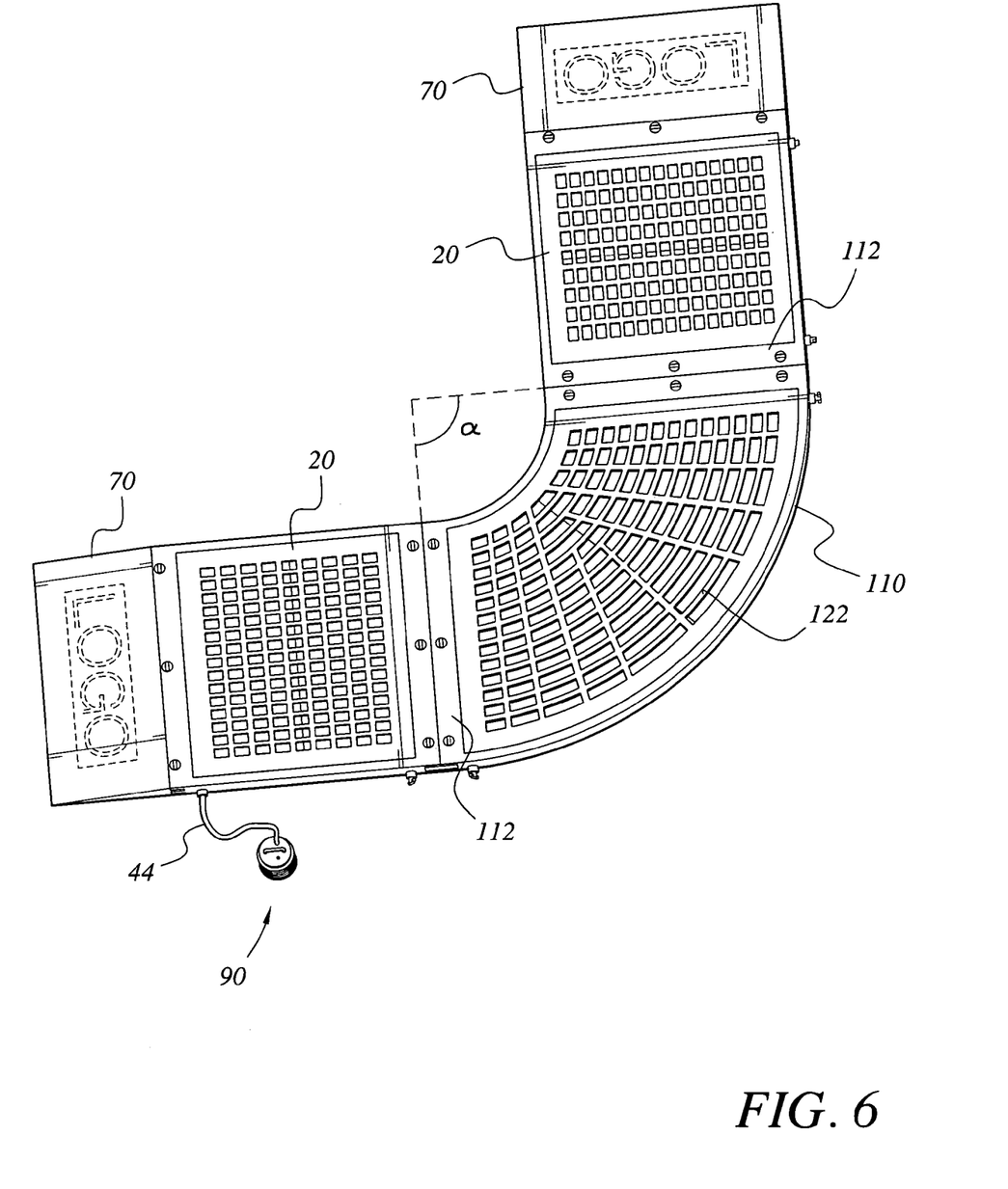
FIG. 6 is a top perspective view of a drip mat of the present invention showing two straight center sections and one curved center section, two ramps, and two straight section grills and one curved section grill.

Referring now to FIG. 6, the mat 10 may include at least one arcuate collection block 110 that subtends an angle α in order to conform to curved driveways. Arcuate collection block 110 may be connected between linear collection blocks 20 by spline joints 112. The angle α subtended by collection block 110 may be any angle, preferably one of the group of 30°, 45°, 60°, or 90°. The arcuate collection block 110 includes an arcuate grill 122 disposed over the well defined in the block 110. Obviously linear collection blocks 20, arcuate collection blocks 110, and ramps 70 are formed with flat bottom surfaces to rest firmly upon the ground or road surface.

Advantageously, the drip mat 10 of the present invention requires no absorbent material that would require periodic replacement, thereby reducing maintenance costs. It will be apparent from the foregoing specification that the drip mat 10 of the present invention is assembled from modular components that may be installed quickly and easily, reducing labor costs. The provision of display areas on the ramps 70 provides an aesthetically pleasing, yet functional, appearance to the drip mat 10 of the present invention.

Figure 7:
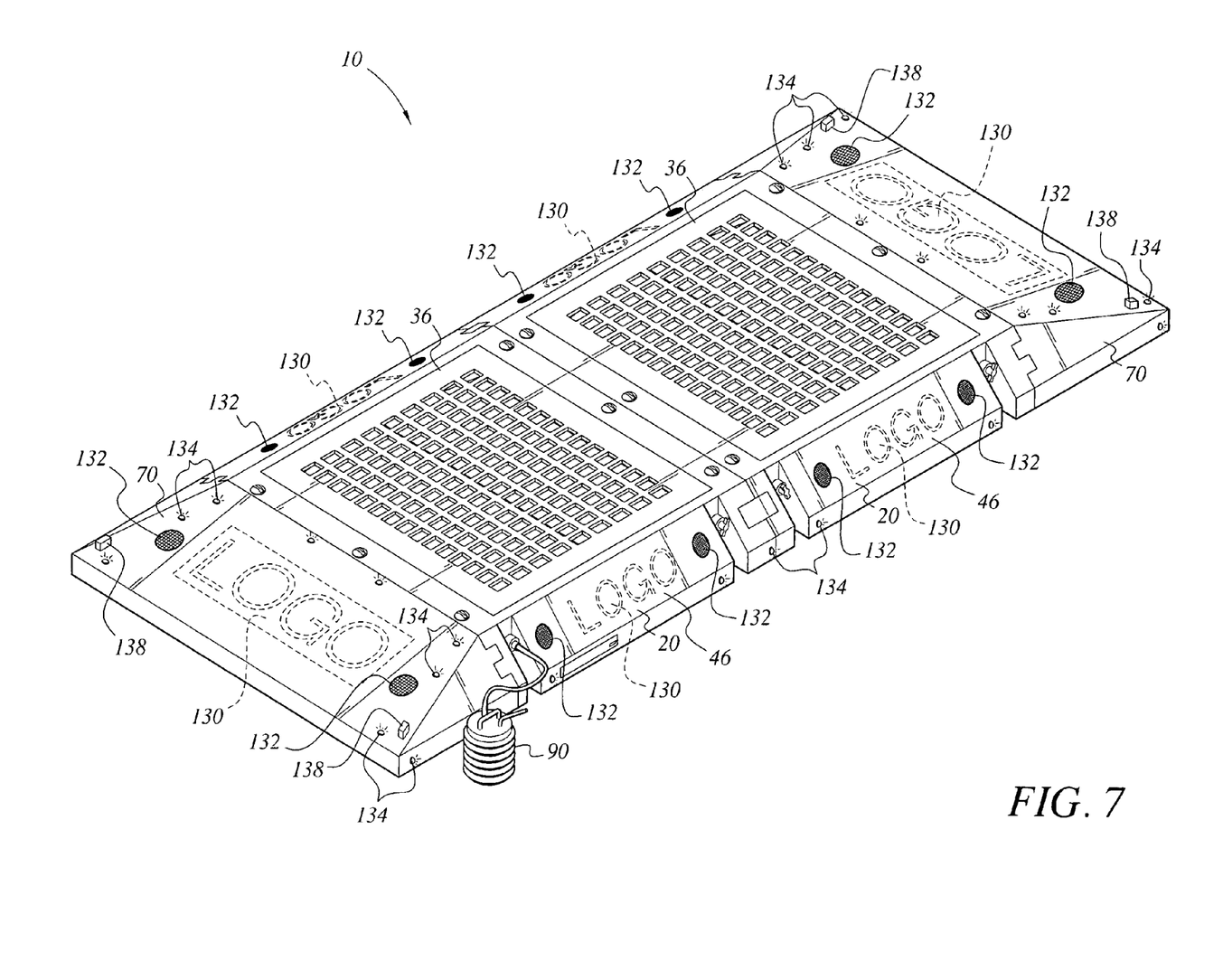
FIG. 7 is a perspective view of a drip mat with electronics according to the present invention.
Figure 8:
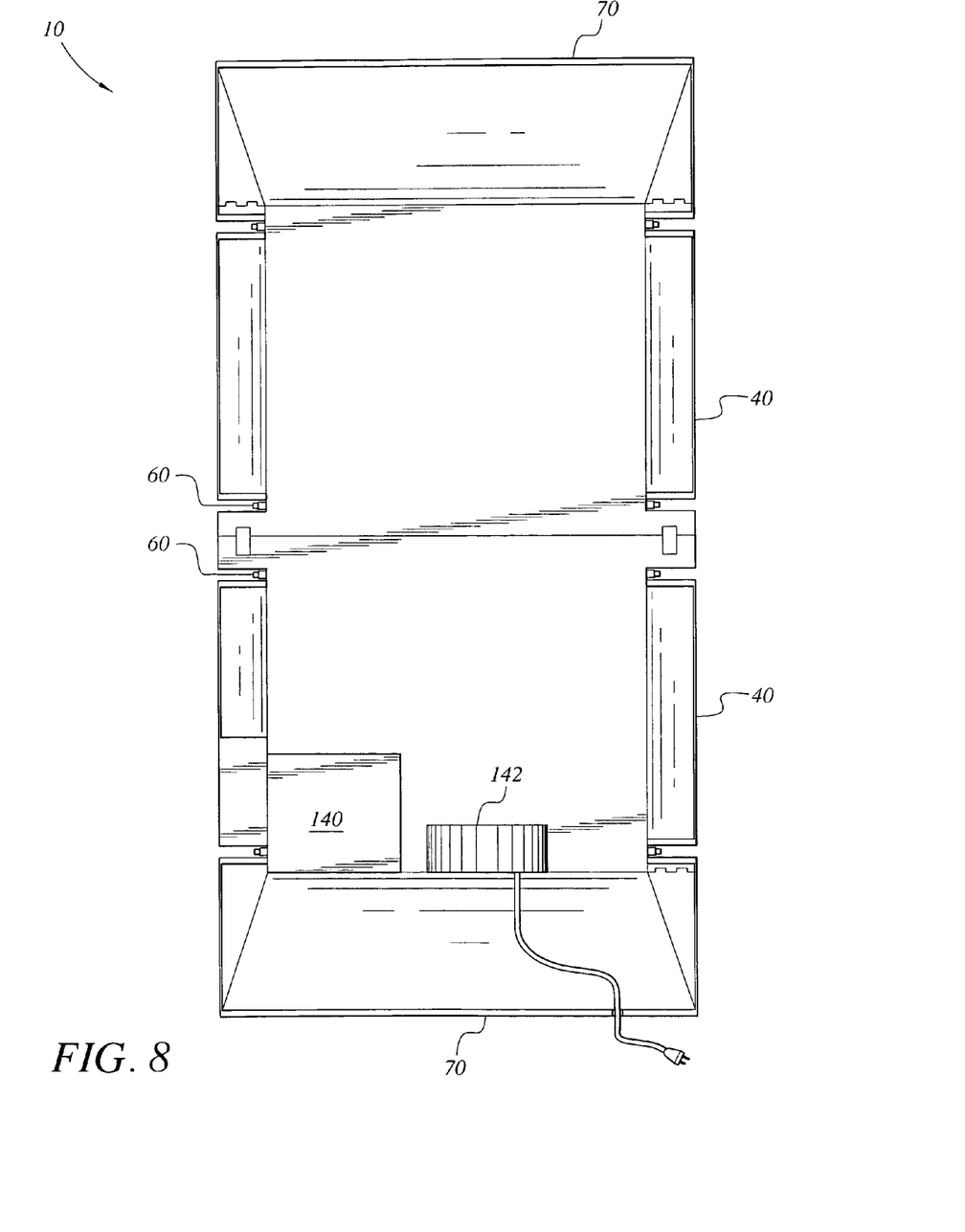
FIG. 8 is a bottom cross-sectional view of a drip mat with electronics according to the present invention.

As shown in FIG. 7, the drip mat 10 may additionally include a plurality of electronic features to enhance the display. The display areas on the ramps 70 may include electronic video screens 130 to show advertisements or other related video. Audio speakers 132 may be disposed around the ramps 70 and outside surfaces 46 of the sidewalls of the drip mat 10 to provide audio messages, including voice, music and other audio corresponding to the video playing on the video screens 130. An array of regularly spaced LED lights 134 may be disposed about the periphery of the video screens 130. The LED array may be illuminated continuously or in a pattern, such that the LED's 134 enhance the visibility of the drip mat 10. The audio and video messages may be stored on CD, DVD or other medium, and played by the appropriate electronic media playing device 136 as incorporated into the sidewall 40 of the drip mat 10. Sensors 138 on the ramps 70 may detect approaching vehicles V to activate the audio and video messages. Referring to FIG. 8, the electronic displays may be powered by a battery 140 or retractable power cord 142 disposed in the bottom of the drip mat 10.

It is to be understood that the present invention is not limited to the embodiments described above, but encompasses any and all embodiments within the scope of the following claims.

I claim:

1. A drip mat for collecting fluids leaking from a motor vehicle, comprising:

a plurality of elongate fluid collection blocks, each of the blocks having a floor and at least one sidewall extending around the floor and defining a well, the floor having a raised ridge extending transversely across the well having opposite ends, each of the blocks further having a first end having a slot defined therein and a second end having a plurality of fingers extending therefrom;

a spline disposed in the slots between adjacent collection blocks and adapted for being fastened therein in order to chain the collection blocks together to a desired length;

a grill disposed over the well, the grill having a plurality of apertures defined therein adapted for permitting the fluids to drip into the well; and an entrance ramp and an exit ramp, each of the ramps having a first end with a plurality of fingers extending therefrom detachably forming a finger joint with the second end of one of the collection blocks, and having a second end tapering downward from the first end for driving the vehicle onto and off the collection block.

2. The drip mat according to claim 1, further comprising electronic video displays.

3. The drip mat according to claim 2, further comprising an electronic audio system.

4. The drip mat according to claim 3, further comprising sensors disposed on the ramps for detecting the approach of a vehicle, the sensors being used to actuate the video or audio messages.

5. The drip mat according to claim 1, further comprising an electronic audio system.

6. The drip mat according to claim 1, further comprising an LED array disposed about the periphery of the drip mat, the LED's being illuminable such that the LED's enhance the visibility of the drip mat.

* * * * *